United States Patent [19]

Slocomb

[11] Patent Number: 4,856,230
[45] Date of Patent: Aug. 15, 1989

[54] ULTRA SOUND WELDED WINDOW FRAMES

[75] Inventor: Leon Slocomb, Wilmington, Del.

[73] Assignee: Slocomb Industries, Wilmington, Del.

[21] Appl. No.: 200,352

[22] Filed: May 31, 1988

[51] Int. Cl.$^4$ .............................................. E06B 1/04
[52] U.S. Cl. .................................. 49/504; 49/DIG. 2; 49/506; 52/656
[58] Field of Search ........... 49/504, 501, 380, DIG. 2, 49/506; 160/381; 52/656, 288, 204

[56] References Cited

U.S. PATENT DOCUMENTS

| | | | |
|---|---|---|---|
| 4,042,288 | 8/1977 | Litchfield | 160/381 X |
| 4,090,799 | 5/1978 | Crotti et al. | 52/656 X |
| 4,286,716 | 9/1981 | Budich et al. | 49/504 X |
| 4,570,406 | 2/1986 | DiFazio | 52/656 |
| 4,739,600 | 4/1988 | Lynch et al. | 49/504 X |

Primary Examiner—Philip C. Kannan
Attorney, Agent, or Firm—Connolly & Hutz

[57] ABSTRACT

A window frame made, for example, of a vinyl material is secured together by the utilization of corner key pieces at each of the four corners joining the header and the sill with a pair of side frames. After the frame pieces have been assembled they are permanently secured by the use of ultra-sound welding.

15 Claims, 4 Drawing Sheets

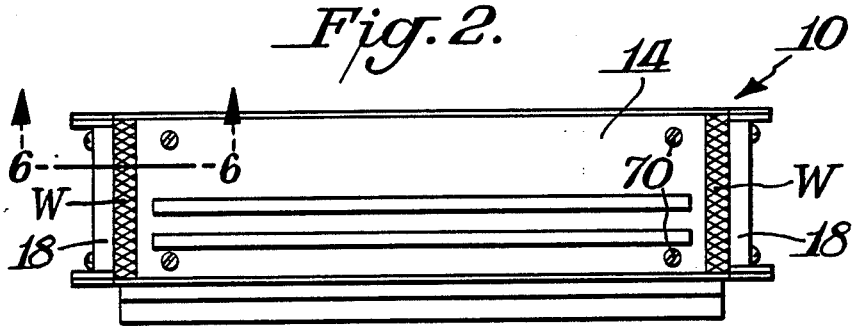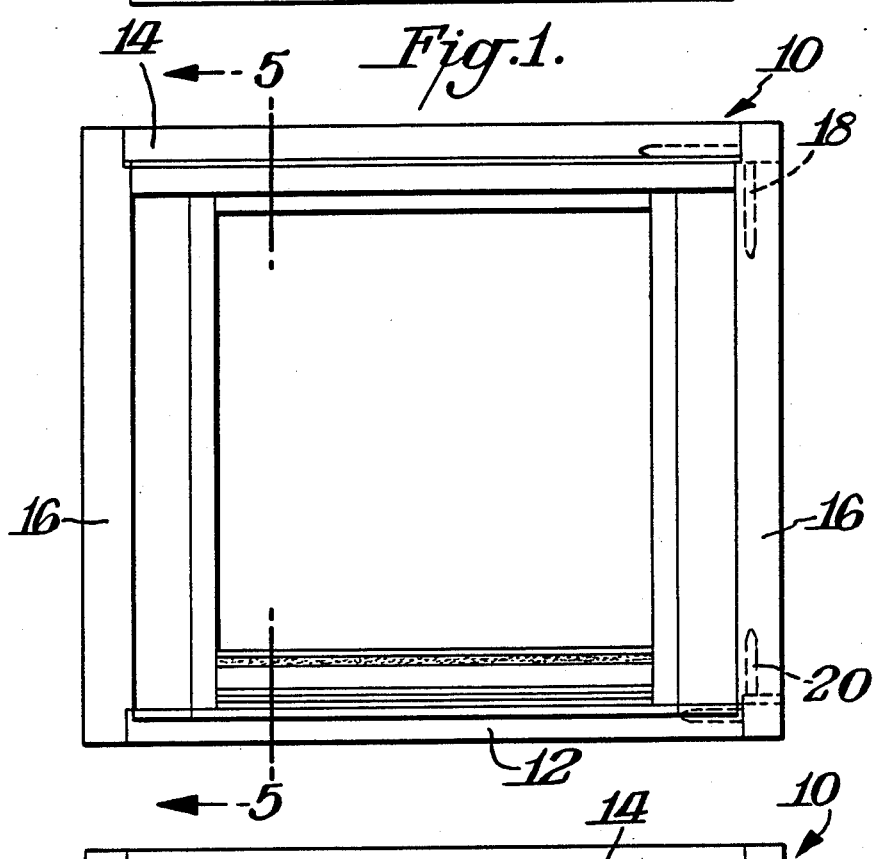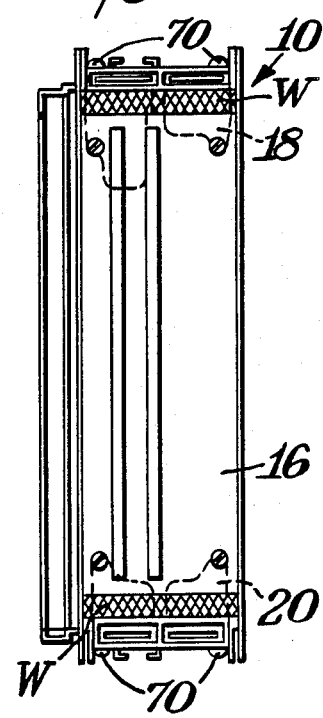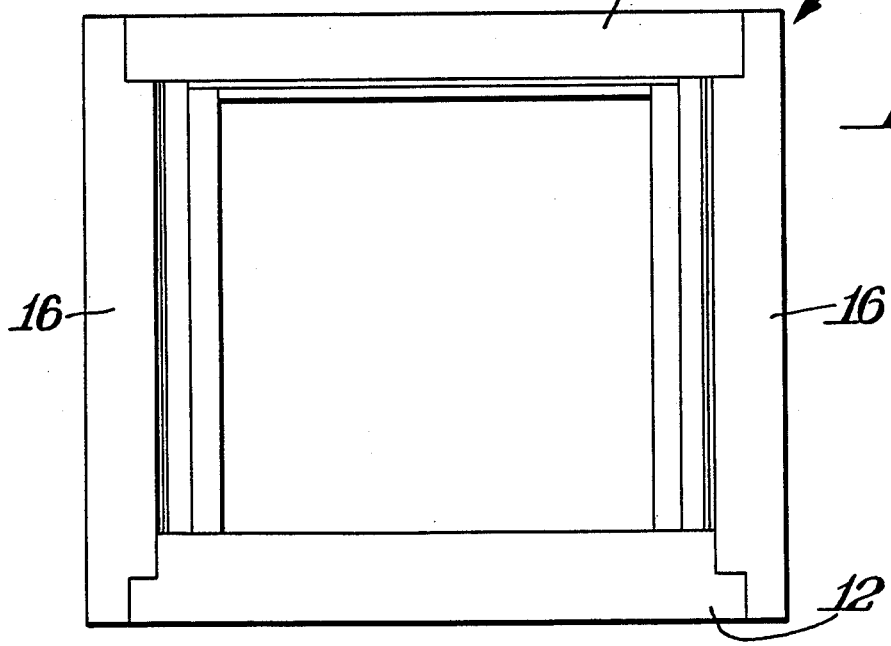

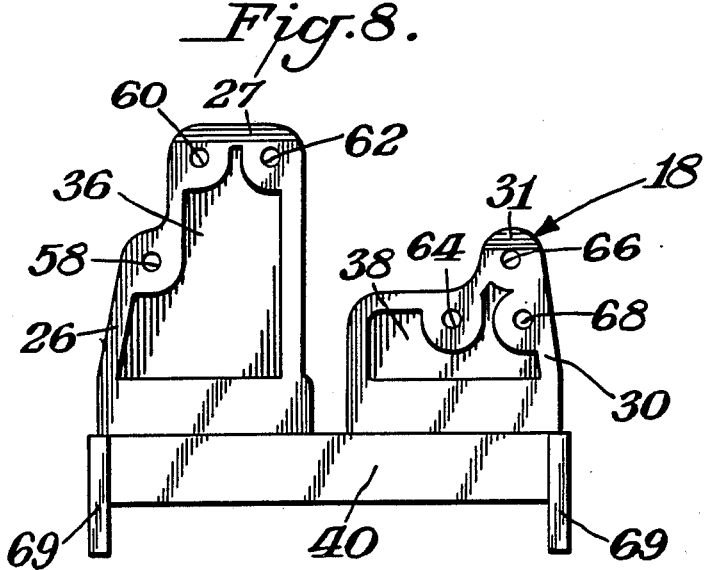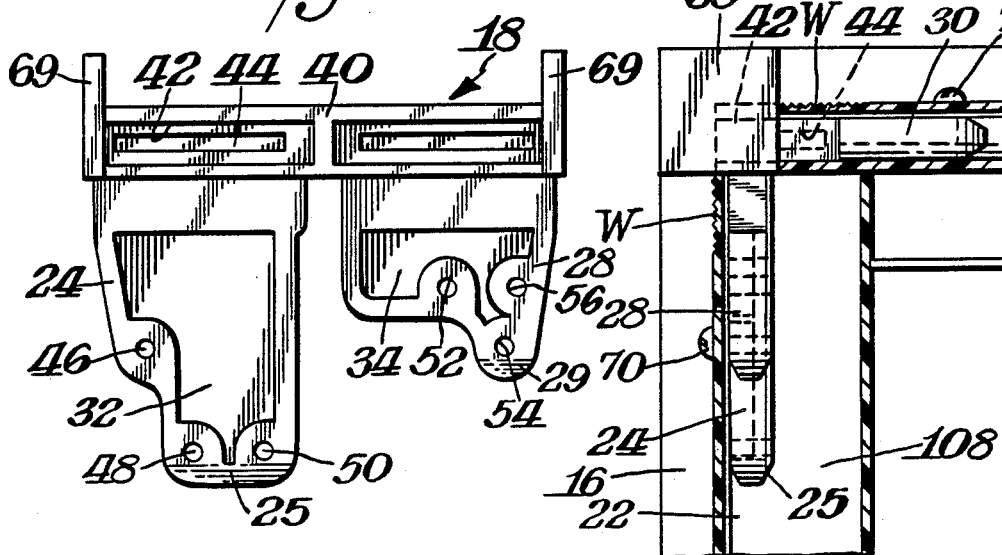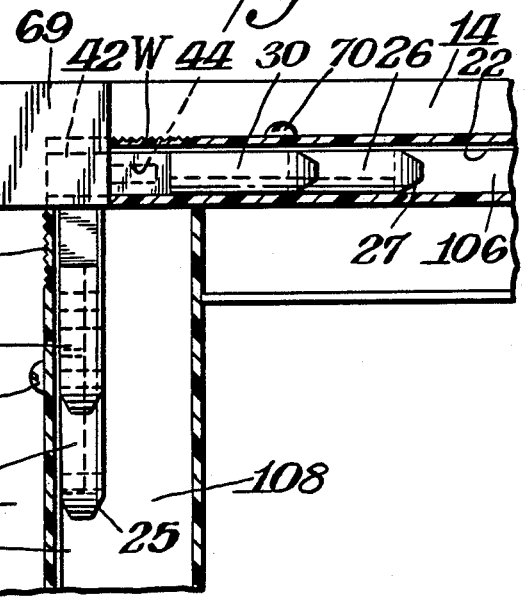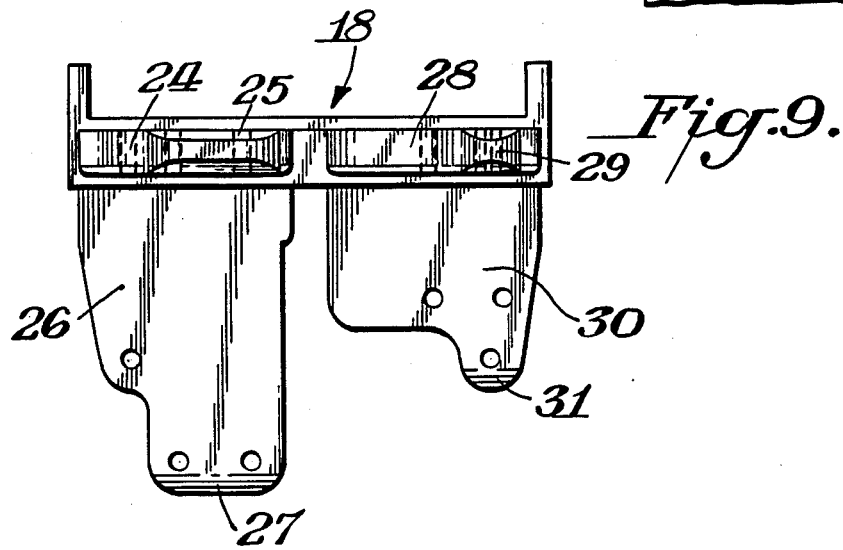

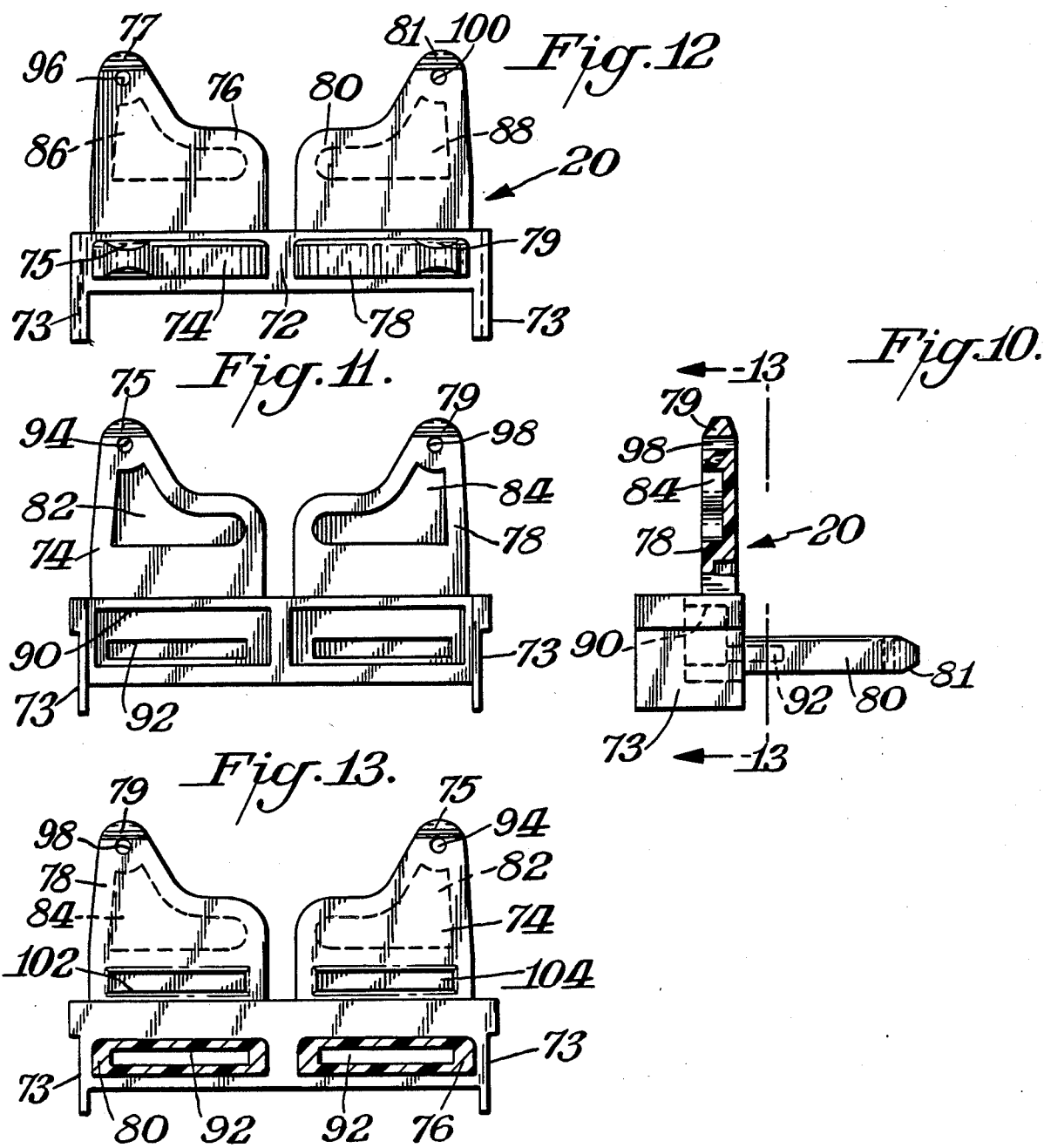

ULTRA SOUND WELDED WINDOW FRAMES

BACKGROUND OF INVENTION

In the conventional construction of a master frame for windows the header and the sill are joined to side frames by the use of welding. Generally, the various pieces forming the frame are mitre cut at a 45° angle and the welding operation which secures the pieces together has the disadvantages of leaving flash material. In addition, this conventional welding method for mounting the pieces together is also relatively time consuming and costly. It would be desirable to provide a method of forming a master frame wherein the various conventional pieces could be secured together in a quick and economical manner and in a manner which leaves a clean final product without the undesired flashing.

SUMMARY OF INVENTION

An object of this invention is to provide a method of fabricating a master frame for a window which is economical and which can be accomplished in a short amount of time.

A further object of this invention is to provide such a method wherein the final operation results in a master frame having no undesired flash.

A still yet further object of this invention is to provide such a master frame made by such method.

In accordance with this invention, the conventional pieces which form the master frame, namely the header, the sill and the sides are joined together by corner keys which fit into openings in these various pieces. As a result, it is not necessary to mitre the pieces, but rather the pieces can have a square cut. After the pieces have been initially assembled together through the use of the corner keys, a final or premanent securement is achieved through the use of ultra-sound welding which can take place quickly without any undesired flash resulting.

THE DRAWINGS

FIG. 1 is a front elevation view of a master frame in accordance with this invention;

FIG. 2 is a top plan view of the master frame shown in FIG. 1;

FIG. 3 is a side elevation view of the master frame shown in FIGS. 1-2;

FIG. 4 is a rear elevation view of the master frame shown in FIGS. 1-3;

FIG. 6 is a fragmental elevation view partly in section of a portion of the master frame shown in FIGS. 1-5;

FIG. 7 is a front elevation view of a corner key used in the master frame shown in FIG. 1-6;

FIGS. 8 and 9 are top and bottom plan views of the corner key shown in FIG. 7;

FIG. 10 is a side elevation view partly in section of a further corner key usable in the master frame shown in Figures 1-6;

FIG. 11 is a front elevation view of the corner key shown in FIG. 10;

FIG. 12 is a top plan view of the corner key shown in FIGS. 10-11; and

FIG. 13 is a cross-sectional view taken through Figure 10 along the line 13-13.

DETAILED DESCRIPTION

Figure 5:
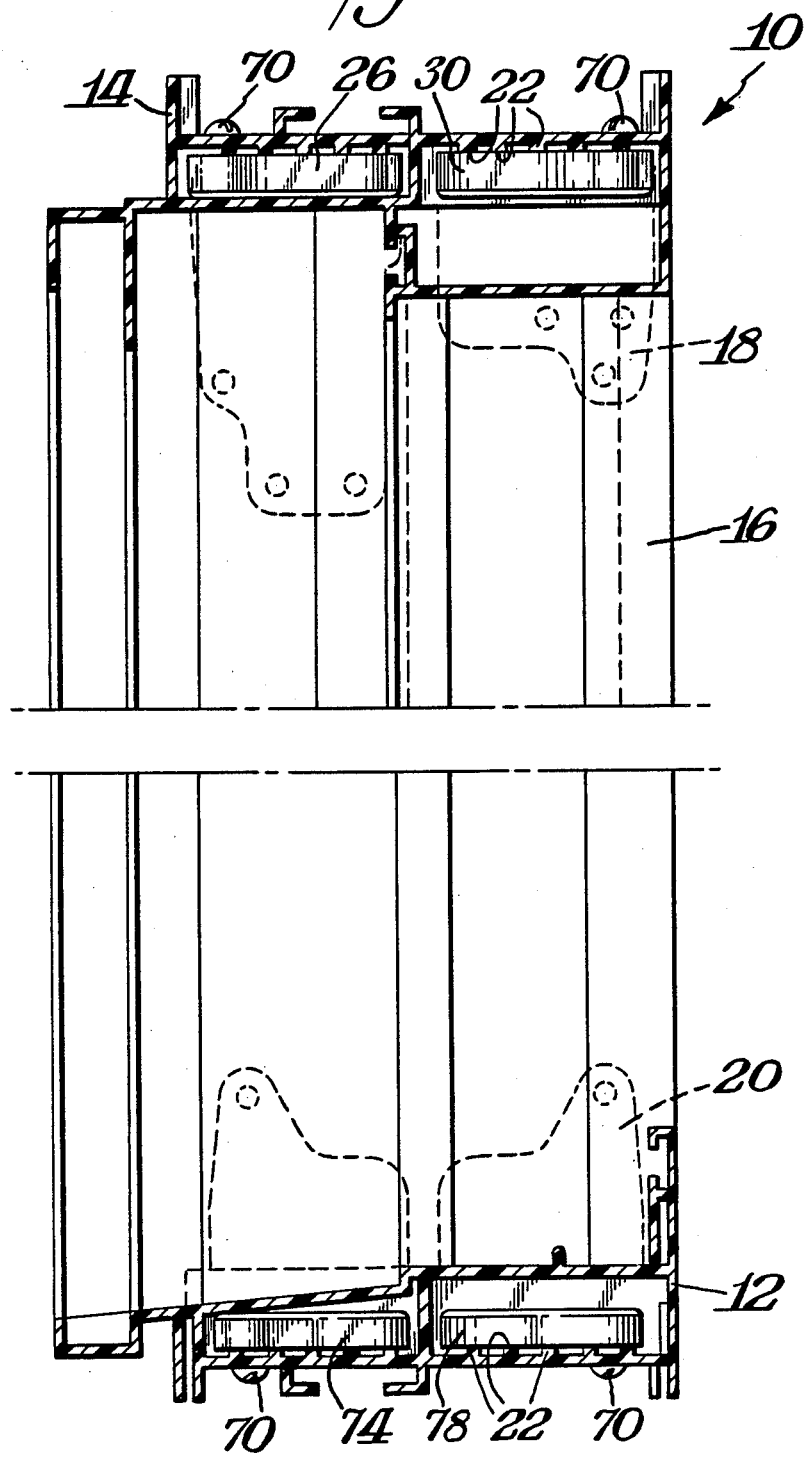
FIG. 5 is a cross-sectional view in elevation taken through FIG. 1 along the line 5-5.

The present invention is directed to the manufacture of a window frame which is hereinafter referred to as a master frame. The drawings illustrate such a master frame 10 which is particularly intended for use in double hung windows. In this respect, the master frame includes pairs of structural means for accommodating two sets of windows. In general, except for some specific modifications including the corner keys and the use of ultra-sound welding, the illustrated master frame 10 is of generally conventional construction. Accordingly, it is not necessary to describe all of the details of such a known frame. In general, the master frame includes a sill 12 and a header 14 interconnected by a pair of side pieces 16, 16. In conventional manufacturing techniques, these pieces of the master frame would be mitre cut at a 45° angle and then welded together using conventional welding techniques. The present invention, however, departs from conventional practices by utilizing specially designed corner keys 18, 20 which are shown in position in FIG. 5 and which are shown in detail in FIGS. 7-9 (corner key 18) and in FIGS. 10-13 (corner key 20).

As noted, a key feature of this invention is the permanent securement of the various pieces through the use of ultrasound welding. In order to faciliate such ultrasound welding technique, the inner surface of the various pieces are provided with raised ribs 22 (see FIG. 5) which provide material to assure a proper weld W by spreading under the influence of the ultra-sound and thus enhance the weld. In addition, the raised ribs help assure a snug seating of the corner pieces.

In the preferred practice of this invention, polyvinylchloride is used as the material for the various components of the hollow extruded master frame. This is doubly advantageous since PVC is the conventional material used in making such master frames and thus the industry is already knowledgeable in the use of such material. In addition, PVC is particularly suitable for ultra-sound welding. It is to be understood, however, that other materials which behave similarly to PVC in that they may be welded by ultra-sound techniques, may also be used without departing from the invention.

FIGS. 7-9 show the details of the upper corner key 18. As indicated therein, corner key 18 includes two sets of plate like projections 24, 26 and 28, 30. Projections 24 and 26 are generally formed as mirror images of each other while projections 28 and 30 are similarly generally mirror images of each other. FIG. 7 illustrates the provision of a dished-out portion 32 which occupies the major area of projection 24. Similarly, a dished-out portion 34 is provided in projection 28. Figure 8 illustrates comparable dished-out portions 36, 38 in projections 26 and 30, respectively. As also illustrated, a central support member 40 is provided from which each of the extensions 24, 26, 28 and 30 extend. Central support member 40 likewise includes a hollowed out portion 42 communicating with a further hollowed out portion 44 as shown in FIG. 7. These various dished-out and hollowed portions of corner key 18 are desirable since they reduce the amount of material, thereby reducing the weight of the corner keys. In addition, the lesser amount of material reduces the heat which occurs during the welding operation which in turn helps prevent buckling.

As also illustrated in FIG. 7-9, a plurality of holes 46, 48 and 50 are provided in extension 24 while holes 52, 54 and 56 are provided in extension 28. Similarly, holes 58, 60 and 62 are provided in extension 26 while holes 64, 66 and 68 are provided in extension 30. These various holes are utilized for alignment with holes in the frame members so that the corner keys may be initially secured to the frame members by conventional screws 70, as shown, for example, in the various figures. The lead end 25, 27, 29 and 31 of each projection is tapered to act as a guide during insertion of the keys into the frame piece channels.

FIGS. 10-13 illustrate the details of the lower connector key 20. As shown therein a central support member 72 is provided having a pair of flanges 73, 73 on each side thereof, similar to flanges 69,69 in the upper connector. Two sets of extensions 74,76 and 78,80 extend outwardly from center support 72 at right angles thereto. Extensions 74 and 76 are generally mirror images of each other (except as later described), while extensions 78 and 80 are also generally mirror images of each other, except as later described.

Dished-out portions 82, 84, 86 and 88 are provided in the various extensions similar to the construction in the upper connector key. Similarly, a hollow central region 90 is provided in support member 72 with a smaller hollow step 92 which is best illustrated in FIG. 10 and is generally similar to the hollow portions 42, 44 of the upper connector key. The lead end 75, 77, 79, 81 of each extension is tapered to form a guide surface during assembly of the keys 20, 20 into the frame pieces.

Each extension includes a hole 94, 96, 98 and 100 for alignment with a corresponding hole in the frame pieces through which a screw 70 may be inserted after the initial assembly of the pieces. Extensions 76 and 80 differ from their corresponding extensions 74 and 78 in that extension 76 and 80 also include dished-out portions 102 and 104.

As previously indicated, raised ribs 22 are provided at uniformly spaced locations on the inner surface of each of the frame pieces. During assembly, the various corner keys are inserted into the members of the master frame with the smooth surface (i.e. the surface opposite the dished-out portions) resting against the raised ribs 22. The corner keys are dimensioned so as to fit snugly in open of the channels 10 of a frame piece with the other set of extensions being in oversized channels, but still in contact with the raised ribs, as shown, for example, in FIG. 6 wherein the oversized channel is indicated by the reference numeral 108. By this dimensioning the snug fitting of a set of corner key extensions creates an initial assembly of the various components. Insertion of the corner keys is facilitated by the tapered lead ends. Screws 70 are then inserted through sets of aligned holes for a better securement before the final securement.

In the next stage of assembly the various members are permanently secured together through the use of ultra-sound welding. Any suitable ultra-sound welding technique may be used. One practice of this invention is a Branson Sonic Power Model 800Z sonic welder is utilized wherein the horn is applied for five seconds resulting in a ultra-sound welding taking only two seconds, as compared with the minutes that would be required using conventional welding techniques. In this ultra-sound welding the ribs provide material which melts and spreads to enhance the resulting weld W. Moreover, the resulting weld W is clean or relatively smooth without any undesirable flash.

What is claimed is:

1. A window frame comprising four perpendicularly disposed hollow extruded plastic frame pieces, a corner key located at the corner of each pair of adjacent frame pieces, each of said corner keys comprising a support member having at least one set of extensions arranged perpendicularly to each other, each of said extensions being inserted into a respective frame piece, raised ribs are provided on the inner surface of each frame piece in contact with said extensions and said frame pieces and said extensions being secured together by an ultra-sound weld, said ribs comprising material to assure a proper weld by spreading under the influence of the ultra-sound, and said ribs further providing a snug seating of said corner keys into said frame pieces.

2. The frame of claim 1 wherein each of said frame pieces terminates in a square cut.

3. The frame of claim 1 wherein each corner key includes two sets of said extensions, and wherein said frame is of the double hung window type.

4. The frame of claim 3 wherein one of said extensions from each of said corner keys is snugly fit into a channel in its corresponding frame piece, and the other extensions of each pair is fit into an oversized channel of its respective frame piece.

5. The frame of claim 3 wherein two of said corner keys comprise upper corner keys which are identical with each other, the other two of said corner keys comprise lower corner keys which are identical with each other, all of said extensions of said lower corner keys being identical in size and shape to each other, and said extensions of said upper corner keys comprising two sets of extensions wherein the extensions of each set are identical in size and shape to each other but different in size and shape to the extensions of its other set.

6. The frame of claim 1 wherein each of said extensions includes at least one dished-out portion.

7. The frame of claim 6 wherein each of said extensions includes at least one hole and a fastener extending through said hole and connected to a respective frame piece.

8. The frame of claim 7 wherein each extension of said set of perpendicular extensions is generally a mirror image in size and shape of the other extensions in said set.

9. The frame of claim 8 wherein two of said corner keys comprise upper corner keys which are identical with each other, and the other two of said corner keys comprise lower corner keys which are identical with each other.

10. The frame of claim 9 wherein each of said corner keys includes two sets of extensions.

11. A window frame comprising four perpendicularly disposed hollow extruded plastic frame pieces, a corner key located at the corner of each pair of adjacent frame pieces, each of said corner keys comprising a support member having at least one set of extensions arranged perpendicularly to each other, each of said extensions being inserted into a respective frame piece, said frame pieces and said extensions being secured together by an ultra-sound weld, raised ribs being provided on the inner surface of each frame pieces in contact with said extensions, each of sid extensions including at least one dished-out portion, each of said extensions including at least one hole and a fastener extending through said hole and connected to a respective frame piece, each extension of said set of perpendicular extensions being generally a mirror image in size and shape of the other extension in said set, two of said corner keys comprise upper corner keys which are identical with each other, the other two of said corner keys comprise lower corner keys which are identical with each other, each of said corner keys including two sets of extensions, one of said extensions from each of said corner keys being snugly fit into a channel in its corresponding frame piece, and the other extensions of each pair being fit into an oversized channel of its respective frame piece.

12. The frame of claim 11 wherein the lead end of each of said extensions is tapered.

13. A method of manufacturing a window frame including the steps of providing four window frame pieces made of extruded hollow plastic material which are disposed at right angles to each other and which have exposed channels, inserting a corner key having at least one set of perpendicular extension into pairs of the frame pieces by inserting an extension into a channel in its hollow frame piece, ultra-sonically welding the frame pieces and corner keys together, the inner surface of each of the frame pieces being provided with spaced ribs, seating the extensions against the ribs before the frame pieces and corner keys are welded together, and utilizing the ribs as material which assures a proper weld by spreading under the influence of the ultrasound.

14. A method of manufacturing a window frame including the steps of providing four window frame pieces made of extruded hollow plastic material which are disposed at right angles to each other and which have exposed channels, inserting a corner key having at least one set of perpendicular extension into pairs of the frame pieces by inserting an extension into a channel in its hollow frame piece, ultra-sonically welding the frame pieces and corner keys together, the inner surface of each of the frame pieces being provided with spaced raised ribs, seating the extensions against the ribs before the frame pieces and corner keys are welded together, initially assembling the corner keys and frame pieces by means of a snug fitting of the extensions into the frame piece channels, and the corner keys and frame pieces are additionally secured together by means of fasteners joining the corner keys to their respective frame pieces.

15. The method of claim 14 wherein each corner key has two sets of extensions, one extension from each set being snuggly fit into a narrow channel in its respective frame piece and the other extension of each set being fit into an oversize channel.

* * * * *